United States Patent
Weiss et al.

(10) Patent No.: US 7,952,781 B2
(45) Date of Patent: May 31, 2011

(54) METHOD AND DEVICE FOR SCANNING LIGHT

(75) Inventors: Yizhar Weiss, Rishon-LeZion (IL); Mordekhai Velger, Rehovot (IL); Sivan Natan-Knaz, Kadima (IL); Raviv Erlich, Rehovot (IL); Alexander Sromin, Ashdod (IL)

(73) Assignee: Elop Electrooptical Industries Ltd., Rechovot (IL)

( * ) Notice: Subject to any disclaimer, the term of this patent is extended or adjusted under 35 U.S.C. 154(b) by 740 days.

(21) Appl. No.: 11/667,709

(22) PCT Filed: Nov. 14, 2005

(86) PCT No.: PCT/IL2005/001194
§ 371 (c)(1),
(2), (4) Date: Dec. 21, 2007

(87) PCT Pub. No.: WO2006/051544
PCT Pub. Date: May 18, 2006

(65) Prior Publication Data
US 2008/0123167 A1 May 29, 2008

(30) Foreign Application Priority Data
Nov. 15, 2004 (IL) .......................................... 165212

(51) Int. Cl.
*G02B 26/08* (2006.01)
(52) U.S. Cl. .................................................. 359/201.1
(58) Field of Classification Search ................ 359/201.1, 359/201.2, 223.1–226.1
See application file for complete search history.

(56) References Cited

U.S. PATENT DOCUMENTS

| 4,003,626 A | 1/1977 | Reinke et al. |
| 6,140,979 A | 10/2000 | Gerhard et al. |
| 2004/0207744 A1 | 10/2004 | Bock |

FOREIGN PATENT DOCUMENTS

WO WO 03/049156 A2 * 6/2003

OTHER PUBLICATIONS

Communciation Relating to the Results of the Partial International Search Dated Mar. 29, 2006 From the International Searching Authority Re.: Application No. PCT/IL2005/001194.
International Preliminary Report on Patentability Dated May 24, 2007 From the International Bureau of WIPO Re.: Application No. PCT/IL2005/001194.
International Search Report and the Written Opinion Dated Jun. 6, 2006 From the International Searching Authority Re.: Application No. PCT/IL2005/001194.
Communication Pursuant to Article 94(3) EPC Dated Feb. 15, 2010 From the European Patent Office Re. Application No. 05804455.3.
Response Dated Aug. 12, 2010 to Communication Pursuant to Article 94(3) EPC of Feb. 15, 2010 From the European Patent Office Re. Application No. 05804455.3.
Office Action Dated Sep. 7, 2010 From the Israel Patent Office Re. Application No. 165212 and Its Translation Into English.

* cited by examiner

*Primary Examiner* — Euncha P Cherry

(57) ABSTRACT

A method of scanning a light beam is disclosed. The method comprises scanning the light beam along a first axis and scanning the light beam along a second axis, such that a functional dependence of the scanning along the first axis is substantially a step-wave, and a functional dependence of the scanning along the second axis is other than a step-wave.

25 Claims, 13 Drawing Sheets
(8 of 13 Drawing Sheet(s) Filed in Color)

METHOD AND DEVICE FOR SCANNING LIGHT

RELATED APPLICATIONS

This Application is a National Phase of PCT Patent Application No. PCT/IL2005/001194 having International Filing Date of Nov. 14, 2005, which claims the benefit of Israel Patent Application No. 165212 filed on Nov. 15, 2004. The contents of the above Applications are all incorporated herein by reference.

FIELD AND BACKGROUND OF THE INVENTION

The present invention relates to light scanning and, more particularly, to a scanning method and device for providing images.

A variety of techniques are available for providing visual displays of graphic or video images to a user. The most familiar of these techniques involves the use of a cathode ray tube (CRT), such as in television displays and monitor displays, which provide images by scanning electron beams. Generally, in such displays the image is uniformly decomposed into a number of picture elements (e.g., pixels) typically of the same size, whereby imagery information (for example, colors and brightness) is consecutively designated for each picture element by applying a rectangular coordinate system, in which the position is non-optionally decided by horizontal and vertical coordinates.

Such systems suffer from several limitations. CRTs are bulky and consume substantial amounts of power hence being undesirable for small-scale applications such as head-mounted or retinal displays. Additionally, the manufacturing cost of CRTs is proportional to the display area thus making them undesirable for large-scale applications such as large screen video projectors. Moreover, the ability of the CRT within a monitor to produce a proportional number of pixels for a unit screen area decreases as the tube size increases. It is recognized that this limits the ability of larger CRTs to produce fine details.

Flat panel displays, such as liquid crystal displays and field emission displays, may be less bulky and consume less power.

A liquid crystal display (LCD) typically includes a matrix of cells and column cells, where each cell contains a liquid crystal. Upon application of an electric field on a particular cell, the liquid crystal is changed from one alignment state to the other and the transmittance of light therethrough is controlled. The many different combinations of all alignment states in the cells in a matrix allow to design the applied electric field so as to provide an image.

A field emitter display typically includes a matrix of row electrodes and column electrodes, such that each cross point can be addressed by signaling the respective row and column electrodes. Upon a suitable signal, addressed to a specific cross point, an electrical field is formed near the respective electrode electrons are extracted from the electrode by tunneling through the surface potential barrier. Once emitted from the electrode, the electrons are accelerated, redirected and focused so as to impinge on a flat surface. The flat surface is typically coated by fluorescent material which is energetically excited by the impinging electrons. When the excited atoms of the fluorescent material experience a transition to a lower energy level, a light is emitting to the eyes of the viewer.

However, similarly to the CRT, flat panel displays become rather expensive for large-scale applications. Conversely, typical flat panel displays utilize screens that are at least several inches across, hence being less favored for applications in which the display is intended to occupy only a small portion of a user's field of view.

Along with a sufficient supply of video equipment and video software, the demand for a large screen image display apparatus for enjoying powerful images has become intensified in recent years. Attempts have been made to develop large-screen video displays which employ a complex arrangement of lenses for projecting the image on a screen. One such system includes three small diameter CRT light sources for the three primary colors of white light (red, green and blue). The three separate colors produced by the CRTs are converged by an arrangement of lenses to project the image on the screen, which can be substantially larger than the screen obtainable using a CRT. However, the brightness and contrast are poor compared to that of a CRT used for home TV video viewing.

Another system includes a liquid crystal panel (a light valve) which spatially modulates and controls the transmission of the three primary colors of white light (red, green and blue) emitted from a light source. An arrangement of lenses focus the light transmitted by the light valve onto a viewing screen such that the three color images are superimposed to form a multi-color image. Although these projectors have fair resolution, there are other unavoidable problems related to this scheme. The incandescent white light source has a relatively short operating life and generates relatively large amounts of heat. The liquid crystal panel devices cannot be manufactured without some minimum number of defects that, in turn, manifest themselves as permanent image artifacts on the screen regardless of the graphic or video source. Additionally, the use of liquid crystal panel introduces a fixed and permanent resolution to the display device, making it very difficult to adapt the electronics to accept other resolutions for display of graphics and text information One approach to overcoming many limitations of conventional displays is a display in which the image is reproduced by a light beam scanning instead of the CRT's electron beam scanning. In these systems, the image is reproduced by having light beams scanned in accordance with horizontal and vertical synchronizing signals. This is generally achieved by a scanner or a scanning assembly, such as scanning mirrors or an acousto-optic device, scans a modulated light beam onto a physical screen or directly to the eyes of a viewer.

Scanned beam display systems can be used for a diversity of applications, from small-scale to large scale applications, including, without limitation, head mounted displays, retinal displays, video projectors and the like.

In head mounted displays light from an optical fiber is projected by a scanning device, such as rotating polygonal mirrors to produce an image on an image plane. Head mounted displays are used in various applications, including training applications such as pilot training in simulators. In such applications, there is a need for head mounted projectors having extremely high resolution over a large field-of-view, so as to provide eye-limiting resolution.

A retinal display is an optical device for generating an image upon the retina of an eye. Light is emitted from a light source, collimated through a lens, then passed through a scanner device. The scanning device defines a scanning pattern for the light. The scanned light converges to focus points on an intermediate image plane. As the scanning occurs the focus point moves along the image plane (e.g., in a raster scanning pattern). The light then diverges beyond the plane. An eyepiece is positioned along the light path beyond the intermediate image plane at some desired focal length. An "exit pupil" occurs shortly beyond the eyepiece in an area where a viewer's eye pupil is to be positioned. A viewer looks into the eyepiece to view an image. The eyepiece receives light that is being deflected along a raster pattern. Modulation of the light during the scanning cycle determines the content of the image. For a see-through virtual retinal display a user sees the real world environment around the user, plus the added image of the display projected onto the retina.

It is recognized that the use of miniature devices in general, and micro-electromechanical systems (MEMS) in particular, is highly advantageous for providing images via scanning. MEMS are of particular interest because they provide sufficient speed for two-dimensional displays. MEMS are fabricated using integrated circuit batch processing techniques and can range in size from micrometers to millimeters. These systems can control and actuate on the micro scale, and function individually or in arrays to generate effects on the macro scale. The development of miniaturized scanning devices is motivated by the prospects of improved efficiency, reduced cost and enhanced accuracy.

In the most general form, MEMS consist of mechanical microstructures, microsensors, microactuators and electronics which are integrated into a single device or platform (e.g., on a silicon chip). The microfabrication technology enables fabrication of large arrays of devices, which individually perform simple tasks but in combination can accomplish complicated functions. Specific for light scanning applications, MEMS consists of scanning micromirrors fabricated using surface-micromachining technology. Scanning micromirrors have numerous advantages over traditional scanning mirrors. For example, they have smaller size, mass and power consumption, and can be more readily integrated with actuators, electronics, light sources, lenses and other optical elements. Additionally, the use of scanning micromirrors allows for more complete integration of the scanning system, thereby simplifies packaging and reducing the manufacturing cost.

Conventional scanning devices and systems typically employ two moving mirrors, one mirror is used in scanning light beams in a vertical direction and the other mirror is used in scanning light beams in the horizontal direction, according to a synchronizing signal. Mechanically, the image resolution is limited by the number of lines that one mirror can scan during the refresh period of another mirror. Thus, the scanning in the vertical direction is typically done by a mirror workable in a low-frequency region (e.g., linear scan), while the scanning in the horizontal direction is done by a resonant mirror which is capable of high-speed operation. Other systems employ two resonant mirrors so as to allow formation of the image via Lissajous figures.

Moving a mirror quickly through a large angle requires high-force actuators to achieve a high resonant frequency. Many types of mechanical actuators for moving mirrors are known in the art [to this end see, e.g., "MEMS Reliability Assurance Guidelines for Space Applications," Brian Stark, Ed., Jet Propulsion Laboratory, Pasadena, Calif., 1999, the contents of which are hereby incorporated by reference]. In recent years, advances have been made in the miniaturization of mechanical actuation, inter alia in the field scanning MEMS. The twisting moment necessary for rotating the mirror can be generated by, for example, magnetic actuator, electrostatic actuator, thermal actuator, piezoelectric actuator and the like.

Magnetic actuators typically utilize a loop of current and/ or a magnetic material to generate a magnetic field, hence to provide the required twisting moment. Industrial attempts to integrate magnetic actuators within MEMS have encountered difficulties in maintaining optimal values of force, temperature or efficiency.

Electrostatic actuators utilize electrical field to provide the required twisting moment. One known method to generate the electrical field is by applying voltage on a parallel plate capacitor. The disadvantage of this method is nonlinearity of the actuation, in particular when relatively large motions are required. Another type of electrostatic actuation is known as a comb drive actuator. A comb drive actuator typically includes rows arcs of interdigitated fingers, whereby half of the fingers are attached to a fixed element and the other half attach to a movable element. By applying the same polarity voltage to elements the resultant electrostatic force repels the movable element away from the fixed element. Conversely, by applying opposite polarity the elements are attracted.

Thermal actuators utilize heating to produce forces and deflections. One type of thermal actuator includes a layered or laminated cantilevered beam having a free end capable of deflecting via thermal expansion in response to temperature gradients among different layers of the beam. Thermal actuators, however, induce large stresses which can cause severe problems for long term reliability. Another type of thermal actuator exploits an effect known as "shape memory alloy effect" in which certain materials, undergoing reversible phase transition, tend to restore their low temperature phase by exerting strong forces. A major drawback of these devices is a fast wear and fatigue of the shape memory alloys, compared to brittle materials.

Piezoelectric actuators are constructed from a material with a suitable crystalline structure. When an external electrical voltage is applied, a mechanical reaction takes place, which, depending on the crystalline structure and the regions where the electrical voltage is applied, causes a compression or tension in a predetermined direction. One limitation of piezoelectric actuators is that the actuation distance is relatively small, typically no more than a few percents of the total length of the piezoelectric material. In addition, piezoelectric actuators generate a considerable amount of heat which reduces the actuation efficiency.

Irrespective of the mechanism which is responsible to the motion of the mirrors, prior art display systems fail to provide high resolution in both the horizontal and vertical directions as demanded by many applications.

For example, one difficulty with prior art displays is a raster pinch, where, due to differences between the actual scan pattern and the optimal raster scan pattern, successive forward and reverse sweeps of the beam results in unevenly spacing of the pixels at several points of the scan pattern. This uneven spacing can cause the pixels to overlap or can leave a gap between adjacent rows of pixels. Moreover, because image information is typically provided as an array of data, where each location in the array corresponds to a respective position in the ideal raster pattern, the displaced pixel locations can cause image distortion.

There is thus a widely recognized need for, and it would be highly advantageous to have a method and device for providing an image via scanning, devoid of the above limitations.

SUMMARY OF THE INVENTION

According to one aspect of the present invention there is provided a method of scanning a light beam, the method comprising: scanning the light beam along a first axis and scanning the light beam along a second axis, such that a functional dependence of the scanning along the first axis is substantially a step-wave, and a functional dependence of the scanning along the second axis is other than a step-wave.

According to further features in preferred embodiments of the invention described below, the functional dependence of the scanning along the second axis is sine or sine-like functional dependence.

According to still further features in the described preferred embodiments the functional dependence of the scanning along the second axis is a pulse wave.

According to still further features in the described preferred embodiments a characteristic period of the step-wave is selected so as to provide a substantially abrupt offset motion of the light beam along the first axis, each time an individual scan along the second axis is completed.

According to another aspect of the present invention there is provided a device for scanning a light beam, the device comprising a first mirror for scanning the light beam along a first axis, and a second mirror for scanning the light beam along a second axis, the first mirror being subjected to a first driving force and capable of assuming a plurality of substantially discrete angular positions, and the second mirror being subjected to a second driving force and capable of performing a continuous and periodic rotary motion, wherein the first driving force is modulated by a step-wave and the second driving force is modulated by a modulating function other than a step-wave.

According to further features in preferred embodiments of the invention described below, the first mirror is a first micromirror and the second mirror is a second micromirror.

According to still further features in the described preferred embodiments the device further comprises a sensing mechanism for sensing a scanning position of the light beam, and a synchronizer, for using the scanning position to synchronize the plurality of substantially discrete angular positions of the first mirror and the continuous and periodic rotary motion of the second mirror.

According to still further features in the described preferred embodiments the device further comprises a first stator assembly defining a magnetic circuit for applying the first driving force.

According to still further features in the described preferred embodiments the device further comprises a substrate formed with at least one cavity, whereby the first stator assembly is positioned in one or more cavities.

According to still further features in the described preferred embodiments the device further comprises a second stator assembly defining a magnetic circuit for applying the second driving force.

According to still further features in the described preferred embodiments the device further comprises a substrate formed with a plurality of cavities, whereby each of the first stator assembly and the second stator assembly is positioned in at least one cavity.

According to still further features in the described preferred embodiments the device further comprises at least one optical element for establishing an optical path between the first micromirror and the second micromirror.

According to still further features in the described preferred embodiments the device further comprises at least one non-visible light source for emitting non-visible optical signals impinging on the first and the second micromirrors, and at least one position sensitive detector for detecting the non-visible optical signals thereby sensing orientations of the first and the second micromirrors.

According to yet another aspect of the present invention there is provided a method of scanning a light beam, comprising scanning the light beam along a first axis in a discrete manner and scanning the light beam along a second axis in a continuous and periodic manner, the discrete manner is characterized by a substantially abrupt offset motion of the light beam along the first axis each time an individual scan along the second axis is completed.

According to further features in preferred embodiments of the invention described below, the scan along the second axis comprises resonantly scanning along the second axis.

According to still further features in the described preferred embodiments a functional dependence of the scanning along the second axis is sine or sine-like functional dependence.

According to still further features in the described preferred embodiments the substantially abrupt offset motion is selected so as to allow sequential scanning along the first axis.

According to still further features in the described preferred embodiments the substantially abrupt offset motion is selected so as to allow interlaced scanning along the first axis.

According to still further features in the described preferred embodiments the method further comprises sensing a scanning position of the light beam and using the scanning position to synchronize the scan along the first axis and the scan along the second axis.

According to still further features in the described preferred embodiments the method further comprises generating the light beam using an image source, hence the light constitutes an image.

According to still further features in the described preferred embodiments the method further comprises projecting the light beam on a displaying object while scanning along the first and the second axes, thereby displaying the image on the displaying object.

According to still further features in the described preferred embodiments the displaying object is selected from the group consisting of a screen, a retina, a transparent substrate, a semi transparent substrate and a wearable device.

According to still another aspect of the present invention there is provided a microelectromechanical system, comprising: a rotor assembly, having at least one micromirror formed with a permanent magnetic material mounted thereon, wherein a shape of the at least one micromirror is selected so as to minimize a moment-of-inertia of the at least one micromirror with respect to a first axis; and a stator assembly, having an arrangement of coils for applying a predetermined moment on the at least one micromirror, such that a rotary motion of the at least one micromirror about the first axis is established.

According to further features in preferred embodiments of the invention described below, the rotor assembly and the stator assembly are positioned in gaseous environment.

According to an additional aspect of the present invention there is provided a microelectromechanical system, comprising a rotor assembly, having at least one micromirror surrounded by a gaseous environment and formed with a permanent magnetic material mounted thereon, and a stator assembly, having an arrangement of coils for applying a predetermined moment on the at least one micromirror, such that a rotary motion of the at least one micromirror in the gaseous environment is established.

According to further features in preferred embodiments of the invention described below, the gaseous environment is air.

According to still further features in the described preferred embodiments the at least one micromirror comprises a reflective surface and elongated wings connected thereto, such that when the moment is applied on the elongated wings, the reflective surface is rotated about the first axis.

According to still further features in the described preferred embodiments the microelectromechanical system serves as a component in a light detection and ranging (LIDAR) system.

According to still further features in the described preferred embodiments the microelectromechanical system serves as a component in a laser radar.

According to still further features in the described preferred embodiments the microelectromechanical system serves as a component in an optical switch.

According to still further features in the described preferred embodiments the microelectromechanical system serves as a component in a night vision system.

According to still further features in the described preferred embodiments the microelectromechanical system serves as a component in an endoscopic device.

According to still further features in the described preferred embodiments the microelectromechanical system serves as a component in a medical laser system for surgical applications.

According to still further features in the described preferred embodiments the microelectromechanical system serves as a component in a retinal display system.

According to still further features in the described preferred embodiments the microelectromechanical system serves as a component in a head up display system.

According to still further features in the described preferred embodiments the microelectromechanical system serves as a component in a helmet integrated display system.

According to still further features in the described preferred embodiments the microelectromechanical system serves as a component in a head mounted display system.

According to still further features in the described preferred embodiments the microelectromechanical system serves as a component in a stereoscopic display system.

According to still further features in the described preferred embodiments the microelectromechanical system serves as a component in a video projector system.

According to yet an additional aspect of the present invention there is provided an image display system, comprising: (a) an image generating device for providing a light beam constituting sequential image information; (b) a scanning device for scanning the light beam along a first axis and a second axis hence to form an image field spanned by the first and second axes, the device having a first mirror for scanning the light beam along a first axis, and a second mirror for scanning the light beam along a second axis, the first mirror being subjected to a first driving force and capable of assuming a plurality of substantially discrete angular positions, and the second mirror being subjected to a second driving force and capable of performing a continuous and periodic rotary motion, wherein the first driving force is modulated by a step-wave and the second driving force is modulated by a modulating function other than step-wave; and (c) a synchronizer, communicating with the image generating device and the scanning device, the synchronizer being designed and configured to synchronize the scan of the light beam with the sequential image information.

According to further features in preferred embodiments of the invention described below, the scanning device is capable of forming the image field on at least one retina of a user.

According to still further features in the described preferred embodiments the scanning device is capable of forming the image field on at least one screen.

According to still further features in the described preferred embodiments the system further comprises a wearable device integrated with the image generating device and the scanning device, the wearable device being selected from the group consisting of a helmet integrated display, a head mounted display, a stereoscopic display and a retinal display.

According to still further features in the described preferred embodiments the system is a video projector.

According to still further features in the described preferred embodiments the first driving force is applied by at least one magnetic circuit, generating a step-wave modulated magnetic field.

According to still further features in the described preferred embodiments the second driving force is applied by at least one mechanism selected from the group consisting of a magnetic circuit, a piezoelectric driving mechanism, an electrostatic driving mechanism and a bimetallic driving mechanism.

According to still further features in the described preferred embodiments a characteristic frequency of the modulating function other than step wave substantially equals a resonance frequency of the second mirror.

According to still further features in the described preferred embodiments the modulating function other than step-wave is a smooth-wave modulating function.

According to still further features in the described preferred embodiments the modulating function other than step-wave is a pulse-wave modulating function.

According to still further features in the described preferred embodiments the first mirror is formed with a permanent magnetic material mounted thereon.

According to still further features in the described preferred embodiments the first axis and the second axis are substantially perpendicular.

According to still further features in the described preferred embodiments a characteristic period of step-wave is selected so as to provide a substantially abrupt offset motion of the light beam along the first axis each time an individual scan along the second axis is completed.

According to still further features in the described preferred embodiments a characteristic crest of the step-wave is selected so as to allow sequential scanning along the first axis.

According to still further features in the described preferred embodiments a characteristic crest of the step-wave is selected so as to allow interlaced scanning along the first axis.

According to still further features in the described preferred embodiments the sensing mechanism comprises at least one position sensitive detector.

According to still further features in the described preferred embodiments a shape of the first and/or second micromirrors is selected so as to minimize a moment-of-inertia thereof.

According to still further features in the described preferred embodiments each of the first micromirror and the second micromirror independently comprises a reflective surface and elongated wings connected thereto.

According to still further features in the described preferred embodiments the plurality of coils are arranged such at least two coils of the plurality of coils share a mutual core, thereby defining a magnetic circuit.

According to still further features in the described preferred embodiments the mutual core comprises a magnetic material describing a closed shape and having an airgap.

According to still further features in the described preferred embodiments the closed shape comprises at least four sides, of which one side is interrupted by the airgap and two sides are wound by a conductive wire to thereby form the coils.

According to still further features in the described preferred embodiments the plurality of coils comprises four coils.

According to still further features in the described preferred embodiments the mutual core comprises two opposing poles respectively positioned on a first side and a second side of the airgap, whereby a portion of a respective micromirror of the first and the second micromirror is positioned between the two opposing poles, such that a magnetic field directed along the magnetic circuit applies a magnetic force on the respective micromirror.

According to still further features in the described preferred embodiments the mutual core comprises two opposing poles respectively positioned on a first side and a second side of the airgap, whereby at least one of the elongated wings is positioned between the two opposing poles.

According to still further features in the described preferred embodiments the two opposing poles are substantially trapezoidal.

According to still further features in the described preferred embodiments the scanning device further comprises at least one optical element for establishing an optical path between the first micromirror and the second micromirror.

According to still further features in the described preferred embodiments the at least one optical element is formed on or integrated with a selective light transmissive substrate.

According to still further features in the described preferred embodiments the at least one optical element comprises a reflective layer deposited on the selective light transmissive substrate.

According to still further features in the described preferred embodiments the selective light transmissive substrate is transmissive to visible light and reflective to non-visible light.

According to still further features in the described preferred embodiments the scanning device further comprises at least one non-visible light source for emitting non-visible optical signals impinging on the first and the second micromirrors, and at least one position sensitive detector for detecting the non-visible optical signals thereby sensing orientations of the first and the second micromirrors.

According to still further features in the described preferred embodiments the at least one non-visible light source and the at least one position sensitive detector are positioned in a manner such that an optical path is established between the at least one non-visible light source, the first micromirror, the second micromirror and the position sensitive detector.

According to still further features in the described preferred embodiments the at least one non-visible light source is selected from the group consisting of a light emitting diode and a laser diode.

According to still further features in the described preferred embodiments the light beam is a laser light beam.

According to still an additional aspect of the present invention there is provided a method of manufacturing a microelectromechanical system, the method comprising: (a) patterning and etching a first substrate so as to provide a micromirror; (b) attaching a permanent magnetic material on the micromirror, thereby providing a rotor assembly; (c) patterning and etching a second substrate so as to form at least one cavity therein; (d) attaching a plurality of coils into the cavity or cavities in a predetermined arrangement, thereby providing a stator assembly having an arrangement of coils; and (e) assembling the rotor assembly and the stator assembly, so as to allow a rotary motion of the micromirror in response to a magnetic field generated by the arrangement of coils.

According to further features in preferred embodiments of the invention described below, steps (a)-(b) and steps (c)-(d) are executed substantially contemporaneously.

According to still further features in the described preferred embodiments steps (a)-(b) and steps (c)-(d) are executed substantially sequentially.

According to still further features in the described preferred embodiments the method further comprises applying a reflective coat on the micromirror so as to improve a reflectivity thereof.

According to still further features in the described preferred embodiments the patterning and etching of the first substrate comprises forming a plurality of ribs on a first side of the micromirror.

According to still further features in the described preferred embodiments the etching of the first substrate is effected by a reactive ion etch process.

According to still further features in the described preferred embodiments the etching of the first substrate is effected by a deep reactive ion etch process.

According to still further features in the described preferred embodiments the etching of the first substrate is effected by a reactive ion etch process followed by a deep reactive ion etch process.

According to still further features in the described preferred embodiments the etching of the second substrate is effected by a wet etch process.

According to still further features in the described preferred embodiments the method further comprises wherein etching a base of the cavity or cavities so as to form a plurality of openings therein.

According to still further features in the described preferred embodiments the etching the base is effected by a dry etch process.

According to still further features in the described preferred embodiments each coil of the plurality of coils comprises a core and further wherein the attaching the plurality of coils comprises positioning each core in a respective opening of the plurality of openings.

According to still further features in the described preferred embodiments the method further comprises attaching a pole to each of the plurality of coils.

According to still further features in the described preferred embodiments the first substrate comprises silicon on isolator substrate having a double side silicon dioxide coat.

According to still further features in the described preferred embodiments the method further comprises etching remnants of the silicon dioxide coat, prior to step (b).

According to still further features in the described preferred embodiments the etching of the remnants of the silicon dioxide coat is by potassium hydroxide.

According to still further features in the described preferred embodiments the permanent magnetic material comprises neodymium-iron-boron.

According to still further features in the described preferred embodiments the method further comprises grinding the permanent magnetic material prior to step (b).

According to still further features in the described preferred embodiments the method further comprises dicing the permanent magnetic material prior to step (b).

According to still further features in the described preferred embodiments at least one of the plurality of coils comprises an alloy having iron cobalt and nickel.

The present invention successfully addresses the shortcomings of the presently known configurations by providing a scanning method and scanning device capable of providing high quality images far exceeding prior art technologies.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

Implementation of the method and system of the present invention involves performing or completing selected tasks or steps manually, automatically, or a combination thereof. Moreover, according to actual instrumentation and equipment of preferred embodiments of the method and system of the present invention, several selected steps could be implemented by hardware or by software on any operating system of any firmware or a combination thereof. For example, as hardware, selected steps of the invention could be implemented as a chip or a circuit. As software, selected steps of the invention could be implemented as a plurality of software instructions being executed by a computer using any suitable operating system. In any case, selected steps of the method and system of the invention could be described as being performed by a data processor, such as a computing platform for executing a plurality of instructions.

BRIEF DESCRIPTION OF THE DRAWINGS

The file of this patent contains at least one drawing executed in color photograph. Copies of this patent with color photograph(s) will be provided by the Patent and Trademark Office upon request and payment of necessary fee.

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 1 is a flowchart diagram illustrating method steps of a method of scanning a light beam, according to a preferred embodiment of the present invention;

FIG. 2 is a schematic illustration of device for scanning a light beam, according to a preferred embodiment of the present invention;

FIG. 3 is a simplified illustration of a side view of the device of FIG. 2, according to a preferred embodiment of the present invention;

Figure 4A:
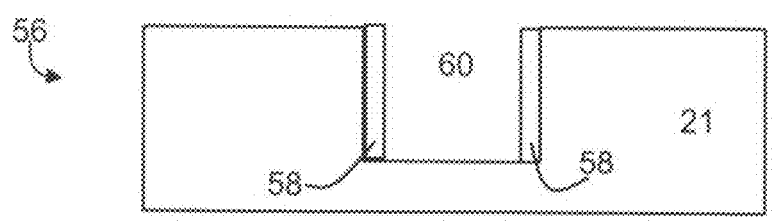
Figure 4B:
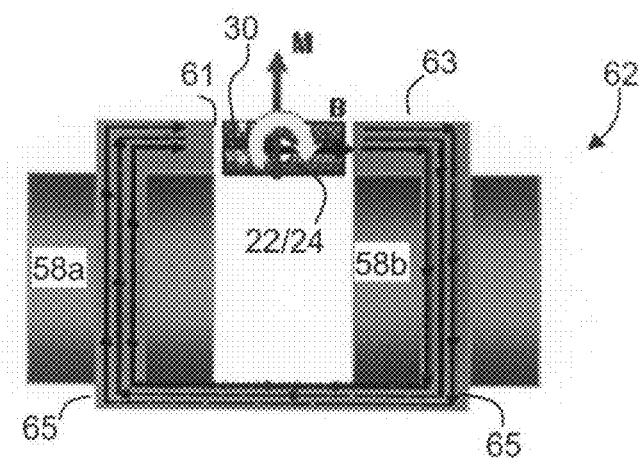
Figure 5:
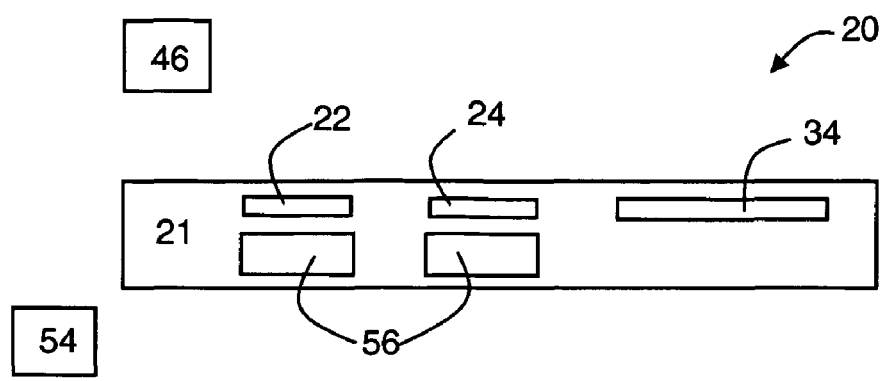
Figure 6:
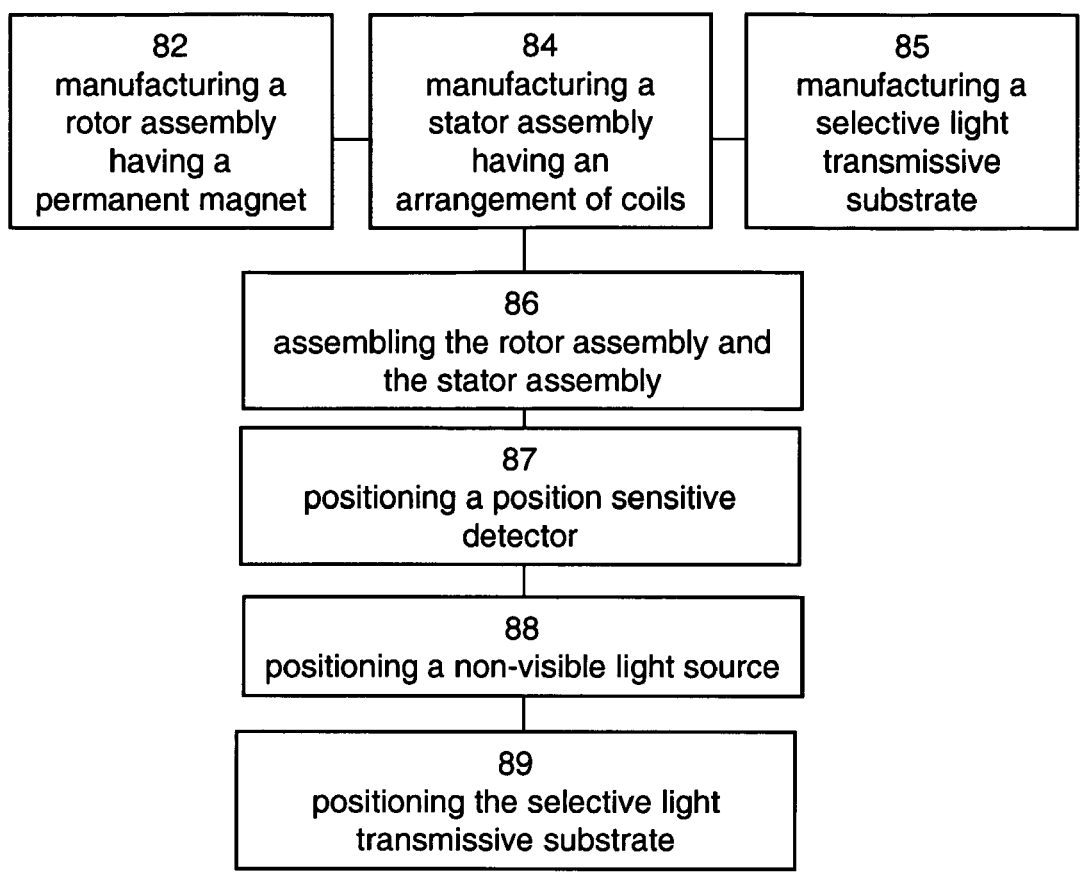
Figure 7:
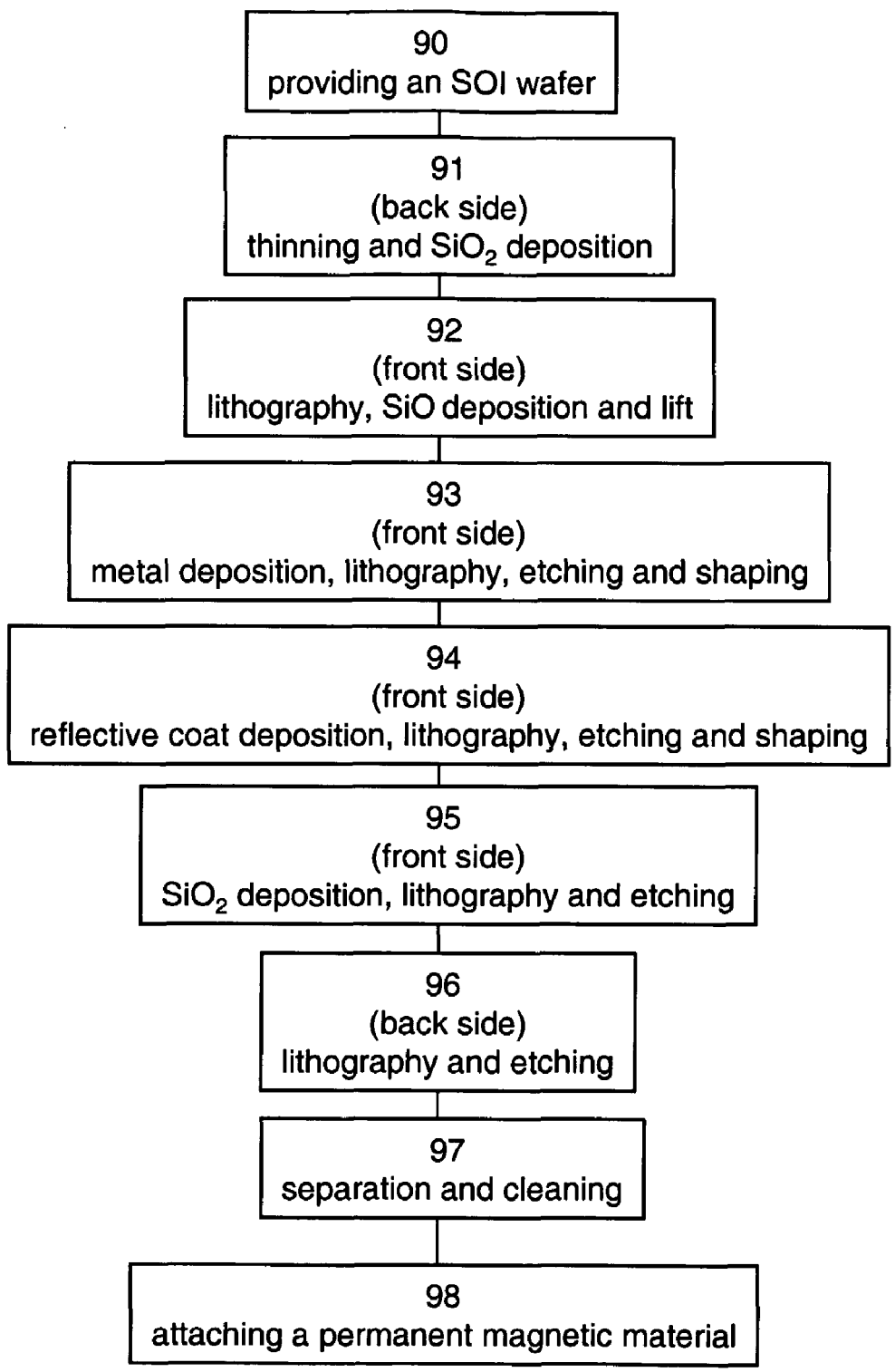
Figure 9A:
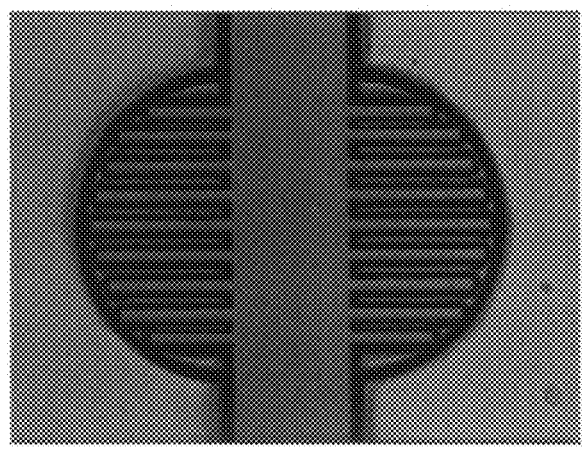
Figure 9B:
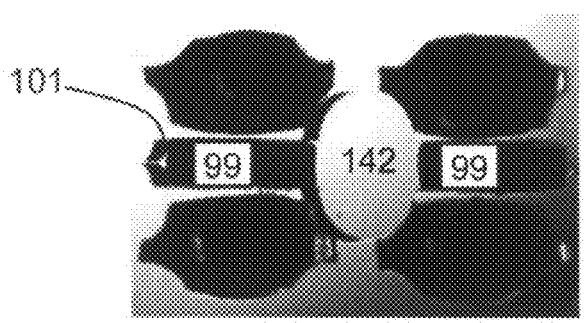
Figure 10:
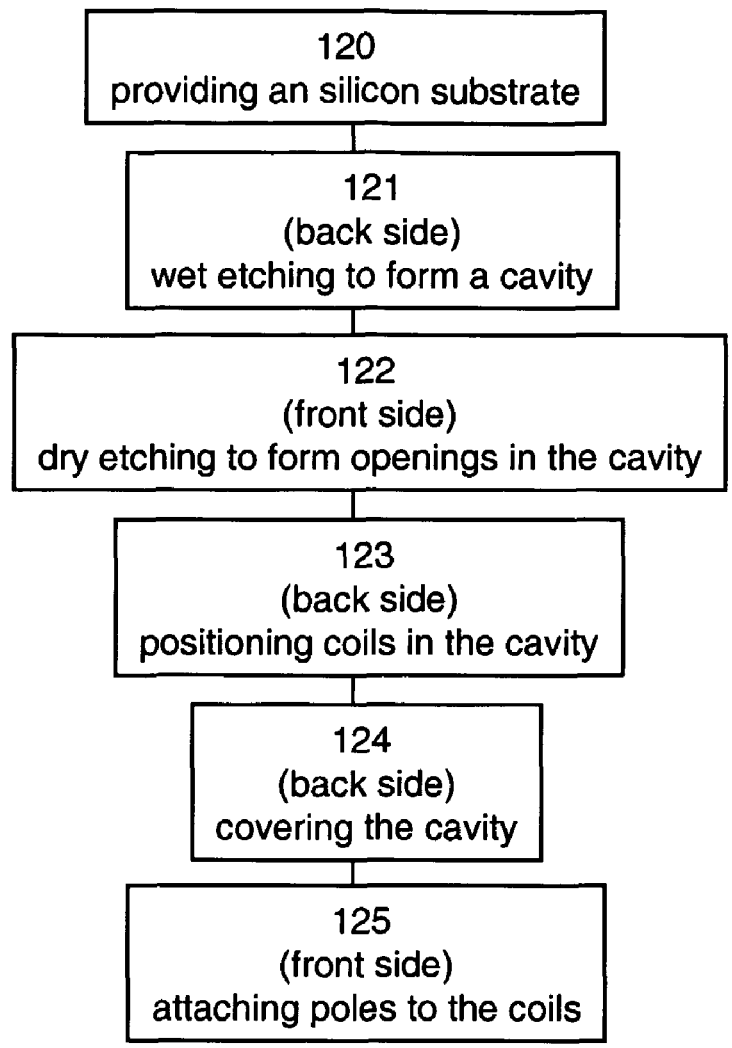
Figure 12A:
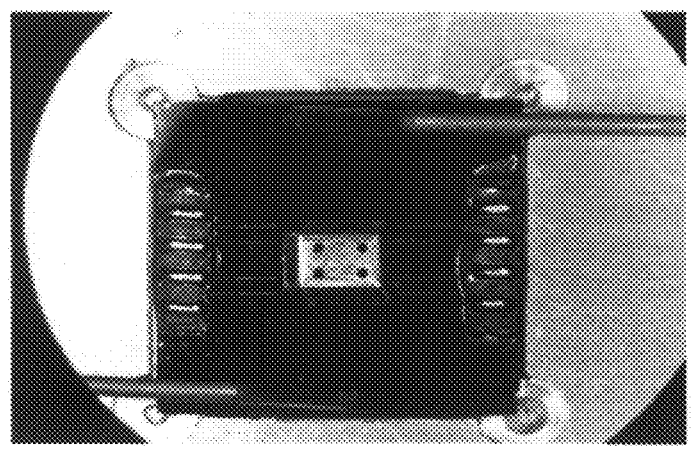
Figure 12B:
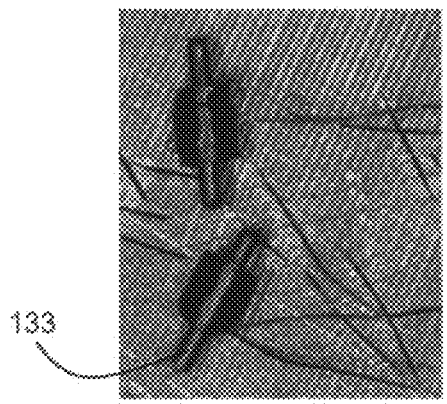
Figure 12C:
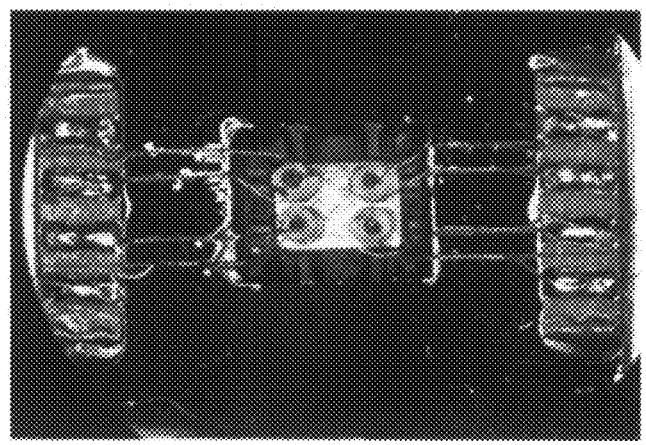
Figure 13:
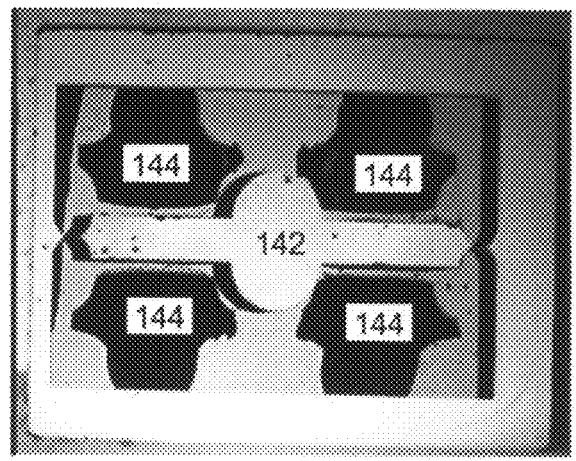
Figure 14:
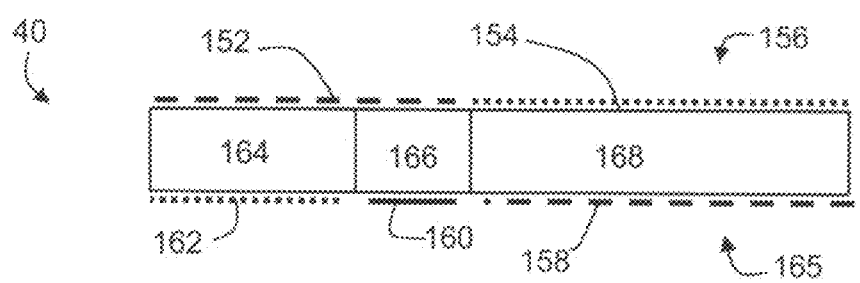
Figure 15:
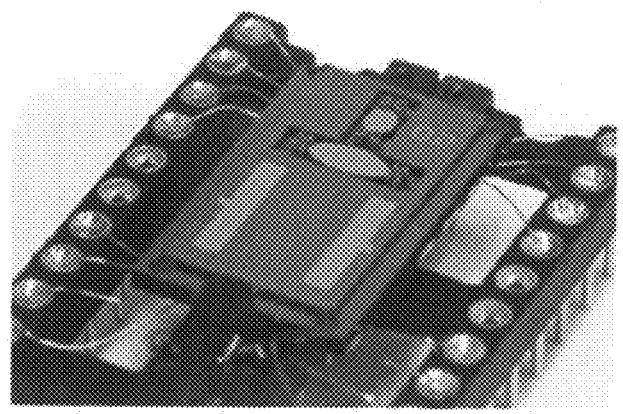

FIG. 4*a* is a schematic illustration of a stator assembly, according to a preferred embodiment of the present invention;

FIG. 4*b* is a schematic illustration of a magnetic circuit, according to a preferred embodiment of the present invention;

FIG. 5 is a schematic illustration of an image display system, according to a preferred embodiment of the present invention;

FIG. 6 is a flowchart diagram illustrating a method of manufacturing a microelectromechanical system, according to a preferred embodiment of the present invention;

FIG. 7 is a flowchart diagram illustrating a method of manufacturing a rotor assembly, according to a preferred embodiment of the present invention;

FIGS. 8*a-e* illustrate and exemplify a manufacturing process of a rotor assembly, according to a preferred embodiment of the present invention;

FIG. 9*a* is an image of the ribs formed on the upper side of an SOI surface, according to a preferred embodiment of the present invention;

FIG. 9*b* is a top view image of a micromirror having a reflective surface and elongated wings to which a magnetic material is attached, according to a preferred embodiment of the present invention;

FIG. 10 is a flowchart diagram illustrating a method of manufacturing a stator assembly, according to a preferred embodiment of the present invention;

FIGS. 11*a-d* illustrate and exemplify a manufacturing process of a stator assembly, according to a preferred embodiment of the present invention;

FIG. 12*a* is an image of a cavity of the stator assembly, according to a preferred embodiment of the present invention;

FIG. 12*b* is an image exemplifying two coils, according to a preferred embodiment of the present invention;

FIG. 12*c* is an image of the stator assembly with the coils attached to the cavity, according to a preferred embodiment of the present invention;

FIG. 13 is an image showing a top view of the microelectromechanical system manufactured using method steps of preferred embodiments of the present invention;

FIG. 14 is a schematic illustration of a light transmissive substrate, according to a preferred embodiment of the present invention; and FIG. 15 is an image showing an isometric view of the microelectromechanical system manufactured using method steps of preferred embodiments of the present invention.

DESCRIPTION OF THE PREFERRED EMBODIMENTS

The present invention is of a scanning method and device which can be used for providing images. Specifically, the present invention can be used in many small-scale as well as large-scale image projectors, such as, but not limited to, head up displays, helmet integrated displays, head mounted displays, retinal displays, stereoscopic displays, video projectors and the like. The present invention is further of an image display system incorporating the scanning device, and a method of manufacturing a microelectromechanical system which can be incorporated in the scanning device.

The principles and operation of a scanning method and device according to the present invention may be better understood with reference to the drawings and accompanying descriptions.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

Figure 1:
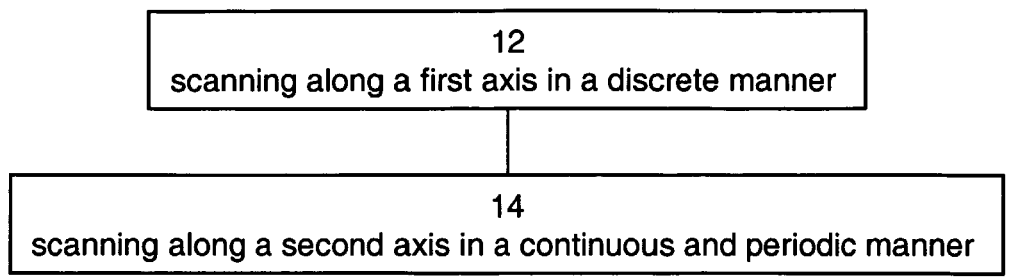

Referring now to the drawings, FIG. 1 is a flowchart diagram illustrating method steps of a method of scanning a light beam, according to one aspect of the present invention.

The light beam can be any beam of light in any single or a plurality of wavelengths, and may have any type of modulation (digital or analog) or no modulation. Preferably, the light beam constitutes an image, for example, in a form of sequential imagery information which can be encoded in the light beam as a time-dependent modulation of the light. Such light beam can be generated from an image source, which either captures the image and generates the light beam substantially in real time, or uses imagery information obtained by another image capturing device. Alternatively, the image source can generate the light beam from imagery information stored in a memory medium. Irrespectively of the image source being used to produce the light beam, the light beam preferably constitutes the image in a manner such that at any instant of time (or, equivalently, at any location along the light beam) the light is modulated in accordance with a different portion of the image.

In a first step of the method, designated by Block 12 of FIG. 1, the light beam is scanned along a first axis in a discrete manner. Specifically, the scan along the first axis is characterized by a substantially abrupt offset motion of the light beam, which can be achieved, for example, using a scanning device subjected to a step-wave driving signal, such that the functional dependence of the scanning along the first axis is substantially a step-wave as further detailed hereinunder. In a second step of the method, designated by Block 14, the light beam is scanned along a second axis, preferably perpendicular to the first axis. The functional dependence of the scanning along the second axis is preferably other than a step-wave, e.g., in a continuous and periodic manner.

Typically, the scanning rate along the first axis is, without limitation, from about 10 Hz to about 100 Hz, and the scanning rate along the second axis is, without limitation, from about 1 kHz to about 1 MHz As used herein the term "about" refers to ±10%.

As will be appreciated by one ordinarily skilled in the art, the scan along the first and second axes facilitates the formation of an image field which is spanned by the two axes. For example, the first axis can be a vertical axis of the image field and the second axis can be a horizontal axis thereof, such that each point in the image field is addressable by a Cartesian coordinate system. It is to be understood that relations other than Cartesian relations between the two axes are also contemplated. A realization of the image field into a visual representation can be achieved by projecting the light beam, once scanned, on a suitable displaying object, depending on the application for which the present embodiment is employed. In video projection applications, the image field can be formed on one or more screens, in retinal displays, the image field is formed on the user's retina or retinas, in head up displays, the image field can be formed on a transparent, or semi transparent substrate, from which a virtual image can be transmitted, e.g., via total internal reflection, in head mounted displays, the image field can be formed on a suitable wearable device, e.g., a helmet, glasses and the like.

It is to be understood, that the scanning can also be performed in a reverse order, in which the light beam is first scanned along the second axis and then scanned along the first axis.

According to a preferred embodiment of the present invention any scan along the second axis can be employed, provided the scan generates the desired portion of the image, e.g., the rows thereof, in the embodiment in which the second axis is the horizontal axis of the image field. A preferred scanning method along the second axis is a resonant scanning having, for example, a sine or a sine-like functional dependence. Other scanning methods, such as linear scan or non-resonant sinusoidal scan are also contemplated.

The advantage of using a discrete scan along the first axis and a continuous and periodic scan along the second axis is that such combination facilitates an ideal or close to an ideal raster pattern which significantly improves the quality of the image formed on the image field. As stated in the Background section hereinabove, prior art systems which, due to technological limitations, employ a smooth scan along both axes, suffer from severe problems of overlapping picture elements, formation of gaps between adjacent picture elements and image distortion. For example, several prior art systems employ a linear driving signal for moving the light beam vertically between rows and a sinusoidal driving signal to obtain horizontal sweeps along each row. Being smooth, the linear driving signal continuously shifts the light beam across rows resulting in poor image quality due to non-horizontal sweeps along the row.

The discrete scan of the present embodiment can thus be used for providing a substantially abrupt offset motion of the light beam from one row to the other, each time an individual scan along a row is completed, thereby providing a substantially horizontal scan along the rows hence an improved image quality. This can be done by an appropriate selection of the driving signal in the scanning device being used. For example, when a step-wave driving signal is used, the width of the steps can be selected to match the duration of a single scan along rows.

The crest of the step-wave driving signal is preferably selected according to the desired patterns for reproducing the visual representation of the image. For example, in one embodiment, the scan along the first axis is selected so as to allow sequential scanning. Sequential scanning is known in the art and is accomplished by increasing the downward rate of travel of the scanning beam so that every successive row is sent. An image is thus formed by moving the beam back and forth as it scans individual lines successively. According to the presently preferred embodiment of the invention, the sequential scanning is achieved by selecting the crest of the step-wave such that each offset motion of the light beam is by about one pixel.

In another embodiment, the scan along the first axis is selected so as to allow interlaced scanning. Interlaced scanning is also known in the art and is accomplished by increasing the downward rate of travel of the scanning beam so that every other line is sent, rather than every successive line. Once the vertical scan is completed, the beam retraces to the top, so as to send the lines that were skipped in the previous scan. The fields produced are often referred to in the literature as the "odd-line" and "even-line" fields, respectively corresponding to odd-number and even-number lines of the image. According to the presently preferred embodiment of the invention, the interlaced scanning is achieved by selecting the crest of the step-wave such that each offset motion of the light beam is by about two pixels. The advantage of using interlaced scanning is the increment of the number of scanning lines resulting in a reduced number of flicks in the image.

Implementation of the above method steps can be done, as stated, using a scanning device. Thus, according to another aspect of the present invention there is provided a device for scanning a light beam, generally referred to herein as device 20.

Figure 2:
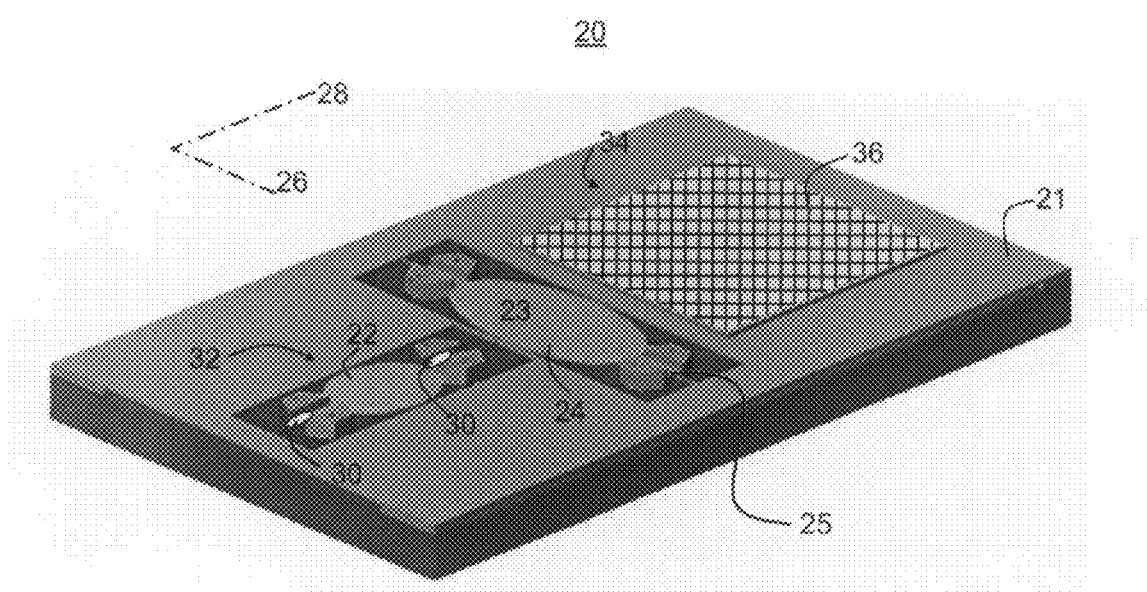

Reference is now made to FIG. 2, which is a schematic illustration of device 20, which comprises, in its simplest configuration, a first mirror 22 for scanning the light beam along a first axis 26, and a second mirror 24 for scanning the light beam along a second axis 28.

According to a preferred embodiment of the present invention the dimension any component of device 20 is in the sub-millimeter range. Specifically, first mirror 22 and second mirror 24 are preferably micromirrors and device 20 preferably comprises a microelectromechanical system (MEMS).

As used herein, a micromirror, a microelectromechanical system or, more generally, any micro-component, refers to a device or a component with a third dimension above a horizontal substrate that is less than about several millimeters. Such devices are typically constructed using semiconductor processing techniques.

In the embodiment, in which device 20 comprises a MEMS, device 20 is preferably formed on a substrate 21 suitable for forming MEMS therein. Representative example, include, without limitation a silicon substrate. First 22 and second 24 mirrors can be made of, for example, a silicon substrate or a silicon-on insulator substrate, and can be coated by a reflective material (e.g., aluminum, gold) to provide improved reflectivity. A detailed process which can be employed during manufacturing of device 20 is exemplified in the Example section that follows.

In use, once scanned along first axis 26 by first mirror 22, the light beam travels toward second mirror 24 which scans it along second axis 28. The optical path of the light beam depends on the relative positions of mirrors 22 and 24. For example, in one embodiment, an optical element (not shown, see FIG. 3) is used for establishing a suitable optical path between first mirror 22 and second mirror 24. As stated, the scanning can also be performed in a reverse order, where the light beam is first scanned by mirror 24 and then scanned by mirror 24.

First mirror 22 is subjected to a step-wave modulated driving force, which is preferably applied using a magnetic circuit generating a magnetic field. According to a preferred embodiment of the present invention first mirror 22 is capable of assuming a plurality of substantially discrete angular positions, so as to provide the aforementioned discrete scan along first axis 26.

Second mirror 24 is subjected to another driving force, which is preferably modulated by a modulating function other than a step-wave, for example, a smooth-wave (e.g., sine modulated, sine-like modulated etc.), a pulse wave (e.g., a square wave). According to a preferred embodiment of the present invention second mirror 24 performs a continuous and periodic rotary motion so as to allow the aforementioned continuous and periodic scan of the light beam along second axis 28. The driving force on second mirror 24 can be applied by any suitable mechanism, including, without limitation, a magnetic circuit, a piezoelectric driving mechanism, an electrostatic driving mechanism and a bimetallic driving mechanism.

The motion of second mirror 24 is preferably at its principal torsion frequency so as to allow fast sweeps along second axis 28. This can be achieved by selecting the modulating function according to the principal torsion frequency of mirror 24.

According to a preferred embodiment of the present invention first mirror 22 is formed with a permanent magnetic material 30 mounted thereon. The attachment of material 30 on mirror 22 can be done by any way known in the art (to this end see, e.g., Jack W. Judy, Richard S. Muller and Hans H. Zappe, "Magnetic Microactuation of Polysilicon Flexure Structures," Journal of Microelectromechanical Systems, 4, 4:162-269, 1995; Jack W. Judy and Richard S. Muller, "Magnetically Actuated, Addressable Microstructures," Journal of Microelectromechanical Systems, 6, 3:249-256, 1997; and H. J. Cho, et al., "A Scanning Micromirror Using a Bi-Directionally Movable Magnetic Microactuator," Proc. SPIE, MOEMS and Miniaturized Systems, pp. 106-115, Clara, 2000, the contents of which are hereby incorporated by reference).

Mirror 22 and permanent magnetic material 30 serve as a rotor assembly 32 which performs the required rotary motion. The shape of first 22 mirror and/or second 24 is preferably selected so as to minimize their moment-of-inertia. For example, the mirrors can comprise a reflective surface 23 and elongated wings 25 connected thereto.

A particular feature of the present invention is the combination of permanent magnet 30 and the shape of mirror 22, which offers the advantages of a relatively low inertia of rotor assembly 32. As the angular acceleration of any rigid body is inversely proportional to its inertia, low inertia of rotor assembly 32 facilitates higher angular acceleration for a given moment applied by the magnetic field. Specifically, the rotary motion can be both initiated and ceased in relatively short transition periods. Thus, unlike conventional systems, assembly 32 can be subjected to a step-wave modulated magnetic field, resulting in the desired discrete angular positions of mirror 22 and discrete scan along first axis 26.

It has been found by the Inventors of the present invention that rotor assembly 32 can be used to generate a step-wave scan of the light, irrespectively in the medium in which mirrors 22 and/or 24 are present. Specifically, the abrupt motion of the mirror(s) can be achieved either in a gaseous environment (e.g., in free-air) or in a vacuum. Operation in free-air is particularly advantageous when device 20 comprises a MEMS, because the manufacturing cost of free-air MEMS is considerably lower compared to vacuum micro-packaging.

Additional advantages of rotor assembly 32 include, without limitation, long life time, low electromagnetic interference and quiet operation.

It is desired to define the scanning rate and the physical deflection distance which characterize the movement of mirrors 22 and 24, so as to meet the limits of the displaying object (e.g., the physical screen or the human eye). To define a raster pattern in which millions of bits of information are communicated onto the displaying object, the position of the light beam or of mirrors 22 and 24 is preferably sensed using a sensing mechanism 34. Hence, device 20 is preferably characterized by a closed loop operation, in which the motion of mirrors 22 and 24 is sensed, processed and being used as a feedback to precisely control the position of the mirrors, substantially in real time.

Sensing mechanism 34 can sense the orientation of the light beam, in which case a portion of the light energy can be redirected (e.g., using a beam splitter) onto mechanism 34, or, more preferably, mechanism 34 can sense the orientation of first 22 and second 24 mirrors, without splitting the light beam.

Any sensing mechanism can be employed. For example, mechanism 34 can comprise one or more (duolateral, tetralateral or quad) position sensitive detector, which outputs a position signal in response to impingement of an optical signal thereon. In this embodiment additional light rays are used for the detection, as further detailed hereinunder. Position sensitive detectors are well known in the art and are commercially available, for example, from Hamamatsu Photonic K.K., Japan.

Generally, a position sensitive detector comprises a matrix having a plurality of addressable elementary units 36, each being capable of converting light into electrical signal. Each elementary unit is allocated for a specific position of the light beam. When an optical signal impinges on the position sensitive detector, the respective elementary unit generates a signal, which can then be analyzed, for example, by a data processor (not shown).

Several types of elementary detection units are contemplated herein. For example, elementary units 36 can be positive-intrinsic-negative (PIN) photodiodes (e.g., monolithic PIN photodiodes). A PIN photodiode is a device having a large, neutrally doped intrinsic region sandwiched between p-doped and n-doped semiconducting regions. A PIN diode exhibits an increase in electrical conductivity as a function of the intensity, wavelength and modulation rate of incident radiation. Elementary units 36 can also be avalanche photodiodes which are capable of generating an amplified current by avalanche multiplication in which electrons, initially generated by the incident light, accelerate and collide with other electrons.

According to an alternative embodiment, the position sensitive detector employs complementary metal oxide semiconductor (CMOS) technology. The advantage of using the CMOS technology is that the elementary units and various quantification parts can be integrated into a single device, which may be compact and simple to operate.

The closed loop operation of device 20 can also be achieved by other sensing techniques including, without limitation, electrostatic techniques (e.g., parallel plate sensors, multiplate sensors, comb-drive sensors), magnetic techniques (e.g., Hall effect sensors), piezoelectric techniques and various types of mechanical techniques (e.g., accelerometers, pressure sensors, resonant sensors and the like).

The output of mechanism 34 can be an analog output, for example, in a form of current, voltage or frequency modulation, or a digital output, for example, serial, parallel or transistor-transistor logic.

Figure 3:
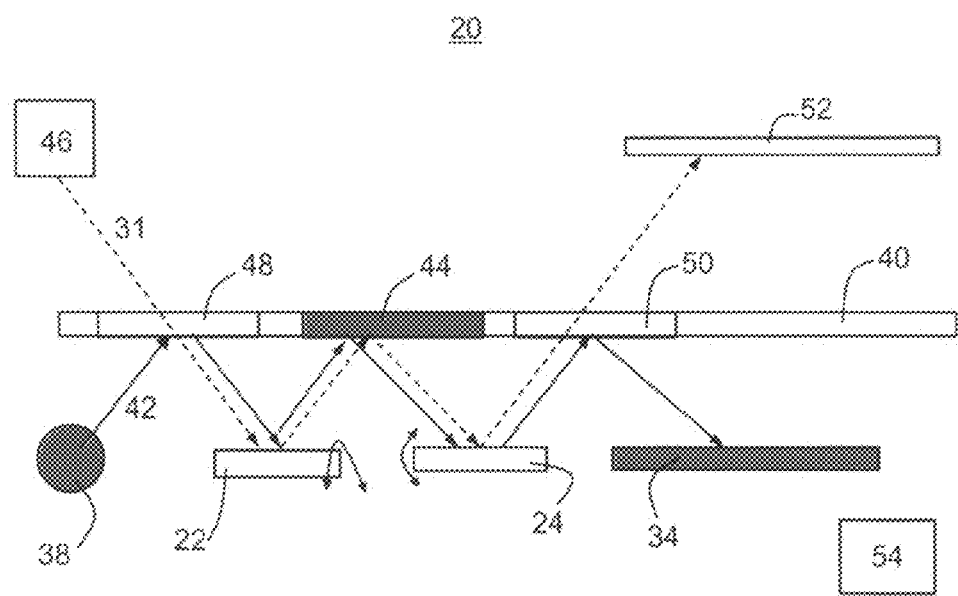

Reference is now made to FIG. 3, which is a simplified illustration of a side view (perpendicular to axis 26) of device 20. Shown in FIG. 3 are first mirror 22, second mirror 24 and sensing mechanism 34, where second mirror 24 is allowed to rotate in the figure plane (about an axis parallel to axis 26) and first mirror 22 is allowed to rotate in a plane perpendicular to the figure plane (about an axis parallel to axis 28). The rotary motions of mirrors 22 and 24 are illustrated in FIG. 3 by double-head arrows. Also shown is an image generating device 46 for providing a light beam 31 having sequential imagery information as further detailed hereinabove.

According to a preferred embodiment of the present invention device 20 further comprises a source 38 of non-visible light (e.g., infrared light), and a selective light transmissive substrate 40. Source 38 can be, for example, a light-emitting diode or a laser diode. Non-visible optical signals 42, emitted by source 38, can be utilized to facilitate the closed loop operation of device 20. Non-visible optical signal 42 is shown as full lines and light beam 31 is shown as dotted line.

Substrate 40 can be any light transmissive substrate, such as, but not limited to, as glass or transparent polymer, and is preferably made selective, such that visible light is transmitted therethrough and non-visible light is reflected thereby. Additionally, device 20 preferably comprise one or more optical elements 44 for redirecting light beam 31 onto second mirror 24, subsequent to its reflection by first mirror 22. According to a preferred embodiment of the present invention optical element 44 is formed in, integrated with or deposited on substrate 44. For example, in one embodiment element 44 is a reflective layer deposited on a confined area of substrate 40, in another embodiment, element 44 is a reflection grating formed on one of the surfaces of substrate 40.

Hence, referring to FIG. 3, light beam 31, generated by image generating device 46, is transmitted through a region 48 of substrate 40, which is transmissive to the wavelength(s) of beam 31, scanned by first mirror 22 in a discrete manner, reflected by optical element 44, scanned by second mirror 24 in a continuous and periodic manner, and transmitted through a region 50 of substrate 40, which is also made transmissive to the wavelength(s) of beam 31. The scanned light beam is then projected on a displaying object 52 (e.g., a screen, a retina) as further detailed hereinabove.

The orientations of mirrors 22 and 24, which are correlated with the position of light beam 31 on object 52, are preferably sensed by mechanism 34 using optical signal 42 emitted by source 38. Specifically, optical signal 42 is reflected by region 48, which in this embodiment is made reflective to the wavelength of optical signal 42, scanned by first mirror 22, reflected by optical element 44, scanned by second mirror 24, reflected by region 50, which is also made reflective to optical signal 42, and impinges on mechanism 34.

Mechanism 34 is responsive to optical signal 42 and preferably generates signals (e.g., electronic signals) which in turn can be received and analyzed, for example, by a data processor 54, which communicates with mechanism 34. Data processor 54 can also communicate with device 46, so as to serve as a synchronizer. Specifically, data processor 54 is preferably designed to include software which uses signals received from device 46 and mechanism 34 to synchronize the motion of mirrors 22 and 24 in accordance with the sequential imagery information constituted by light beam 31, such that at each position of mirrors 22 and 24, the light beam color and intensity correspond to a desired portion of the image.

The rotary motion of first 22 and second 24 mirrors is preferably established, as stated, by a magnetic field applying a moment thereon. According to a preferred embodiment of the present invention, the magnetic field is generated by stator assemblies, in response to a step-wave driving signal (in the case of first mirror 22) or a smooth-wave driving signal (in the case of first mirror 24) which are synchronized by data processor 54 to allow the desired scan pattern of light beam 31. By a judicious synchronization of the driving signals data processor 54 can ensure that (i) the characteristic period of the step-wave modulated magnetic field provides the substantially abrupt offset motion of light beam 31 along first axis 26 each time an individual scan along second axis 28 is completed; (ii) the characteristic crest of the step-wave modulated magnetic field allow sequential or interlaced scanning along first axis 26, as desired; and (iii) the characteristic period of the smooth-wave modulated magnetic field allows weeping complete rows of the image.

Reference is now made to FIG. 4*a* which is a schematic illustration of stator assembly 56, according to a preferred embodiment of the present invention. Stator assembly 56 can be used both as the first stator assembly, establishing the rotary motion of mirror 22 and as the second stator assembly, establishing the rotary motion of mirror 24. Stator assembly 56 preferably comprises an arrangement of coils 58, e.g., four coils, positioned in one or more cavities 60, formed in substrate 21. In a preferred, but not obligatory configuration, two cavities are used for assembly 56, such that two coils are placed in each cavity. The rotary motion of the mirror is preferably actuated a magnetic circuit defined by coils 58. FIG. 4*b* is a schematic illustration of the magnetic circuit of coils 58.

According to a preferred embodiment of the present invention coils 58, are arranged such at least two coils share a mutual core, thereby defining a magnetic circuit. This can be done, for example, by employing cores describing a closed shape having an airgap.

Reference is now made to FIG. 4b, which is a schematic illustration of a magnetic circuit 62, according to a preferred embodiment of the present invention. In this embodiment magnetic circuit 62 is defined by a closed shape having four sides of which one side 63 is interrupted by airgap 61 and two sides 65 are wound by a conductive wire, to thereby form two coils, designated in FIG. 4b by numerals 58a and 58b. Also shown in FIG. 4b is one micromirror, generally designated 22/24, and permanent magnetic material 30. The magnetization vector, M, of material 30 is designated as an upward directed arrow. When electrical current flows in the conductive wire, a magnetic field, B, is generated along the four sides of circuit 62. The field lines of magnetic field are represented in FIG. 4a by arrows circling circuit 62. The interaction between the magnetic field, B, and the magnetization, M actuates the desired rotary motion of micromirror 22/24.

FIG. 5 is a schematic illustration of an image display system 70, according to an additional aspect of the present invention. System 70 preferably comprises image generating device 46, scanning device 20 and data processor/synchronizer 54, as further detailed hereinabove. System 70 can be used in many applications, including, without limitation head up displays, helmet integrated displays, head mounted displays, retinal displays, stereoscopic displays and video projectors as further detailed hereinabove.

Additional objects, advantages and novel features of the present invention will become apparent to one ordinarily skilled in the art upon examination of the following example, which is not intended to be limiting. Additionally, each of the various embodiments and aspects of the present invention as delineated hereinabove and as claimed in the claims section below finds experimental support in the following example.

EXAMPLE

Reference is now made to the following example, which together with the above descriptions illustrates the invention in a non limiting fashion.

MEMS Manufacturing Process

As stated, the dimension of any component of device 20 is preferably in the sub-millimeter range, in which case device 20 preferably comprises a MEMS. Thus, according to a preferred embodiment of the present invention there is provided a method of manufacturing a MEMS. The method comprises the following method steps which are illustrated in the flowchart of FIG. 6. Block 82 represents a step in which a rotor assembly having a permanent magnet is manufactured, and Block 84 represents a step in which a stator assembly having an arrangement of coils is manufactured. Preferred manufacturing processes of the stator assembly and the rotor assembly are further detailed hereinunder. The manufacturing processes represented by Blocks 82 and 84 can be performed either sequentially or contemporaneously. In an additional step of the method, represented by Block 86, the rotor assembly and the stator assembly are assembled together so as to allow a rotary motion of the rotor in response to a magnetic field generated by the stator.

Reference is now made to FIGS. 7 and 8a-e which are a flowchart diagram (FIG. 7) and schematic illustrations (FIGS. 8a-e) of a manufacturing process of a rotor assembly, according to a preferred embodiment of the present invention. In a first step of the manufacturing process, designated by Block 90 a first substrate having a front side and a back side is provided. The first substrate (see FIG. 8a) is preferably a silicon-on insulator (SOI) wafer, which typically comprises a silicon layer 102 on its front side, a silicon layer 104 on its back side and a thin "stop" layer 106 therebetween. Preferred thicknesses of layers 102, 104 and 106 are, without limitation about 60 microns, about 1-2 microns and about 200 microns, respectively.

Figure 8A:
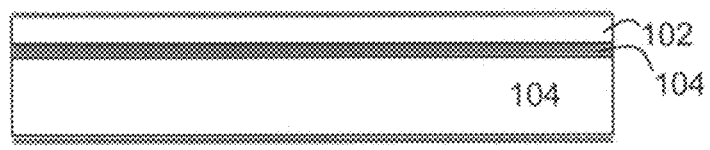
Figure 8B:
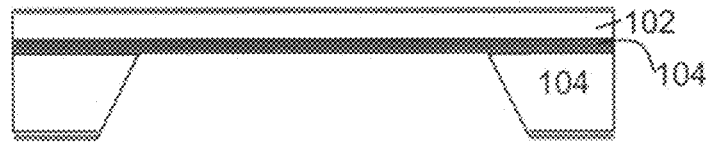
Figure 8C:
Figure 8D:
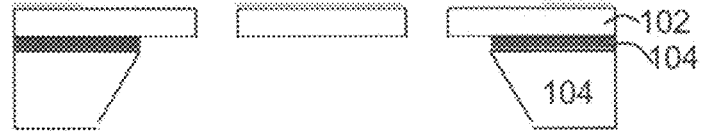

In a second step of the manufacturing process, designated by block 91, layer 104 is preferably subjected to a thinning process followed by silicon dioxide ($SiO_2$) deposition, for example, by evaporation (see FIG. 8a).

In a third step of the manufacturing process, designated by Block 92, layer 102 is preferably subjected to a lithography process followed by silicon oxide (SiO) deposition and a lift technique. The SiO deposition serves for selectively preventing layer 102 from reflecting light.

In a fourth step of the manufacturing process, designated by Block 93, a metal, such as, but not limited to, gold or aluminum is deposited (e.g., by evaporation) on layer 102 so as to form electrical contacts thereon. Subsequently the deposited contacts are preferably subjected to lithography, etching and shaping processes. Preferred thickness of the electrical contacts is, without limitation, in the micrometer scale.

In a fifth step of the manufacturing process, designated by Block 94, a reflective coat, such as, but not limited to, gold or chrome is deposited on layer 102 so as to so as to improve its reflectivity. Similarly to Block 93, the deposition is preferably followed by lithography, etching and shaping processes. Preferred thickness of the reflective coat is, without limitation, in the sub-micrometer scale.

In a sixth step of the manufacturing process, designated by Block 95, silicon dioxide is deposited on layer 102. The deposition is preferably followed by a polymeric lithography and etching processes. According to a preferred embodiment of the present invention, two etching processes are employed: a reactive ion etching (RIE) to form a hard mask from the oxide layer, and a dry reactive ion etching (DRIE) to expose "stop" layer 106 (see FIG. 8c).

In an seventh step of the manufacturing process, designated by Block 96 a polymeric lithography and etching processes are employed on layer 104. Similarly to Block 95, two etching processes (RIE and DRIE) are preferably employed.

In an eighth step of the manufacturing process, designated by Block 97, the substrate is separated to chips and subjected to cleaning process. This can be done, for example, by a buffered HF which is known to remove native oxides on silicon. The buffered HF also removes the silicon dioxide of layer 106. Once the cleaning process is completed, a rotatable micromirror is formed (see FIG. 8d).

According to a preferred embodiment of the present invention the method comprises an optional step in which the SOI wafer is patterned and etched so as to provide the micromirror with a plurality of ribs. The ribs serve for reinforcing the geometrical shape of the micromirror while preserving its relatively low weight. FIG. 9a is an image of the ribs formed on the upper side of the SOI surface.

Figure 8E:
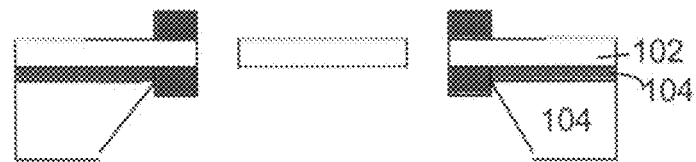

In a ninth step of the method, designated by Block 98, a permanent magnetic material is attached onto the micromirror. The permanent magnetic material is preferably neodymium-iron-boron ($Nd_2Fe_{14}B$) also abbreviated as NdFeB. According to a preferred embodiment of the present invention, the permanent magnetic material can be diced or ground prior to its attachment to the micromirror. Once the permanent magnetic material is attached, a rotor assembly is formed. FIG. 8e illustrates the rotor assembly having a micromirror and four pieces of magnetic material.

FIG. 9b is a top view image of a micromirror having a reflective surface 142 and elongated wings 99 to which a magnetic material 101 is attached.

Reference is now made to FIGS. 10 and 11a-c which are a flowchart diagram (FIG. 10) and schematic illustrations (FIGS. 11a-c) of a manufacturing process of a stator assembly, according to a preferred embodiment of the present invention.

In a first step of the manufacturing process, designated by Block 120 a second substrate having a front side 132 and a back side 134 is provided. The second substrate is preferably a silicon substrate, about 1000 microns in thickness, coated from both sides by $Si_3Ni_4$ (see FIG. 11a).

In a second step of the manufacturing process, designated by block 121 a cavity is formed in back side 134 of the substrate. The formation of the cavity in is preferably by wet etching.

Figure 11A:
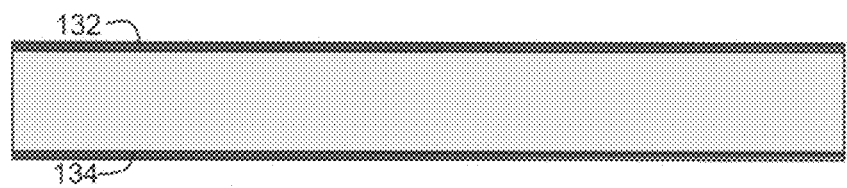
Figure 11B:
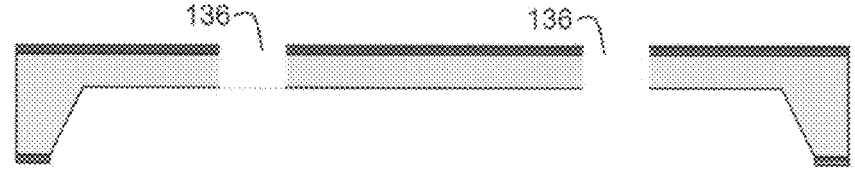
Figure 11C:
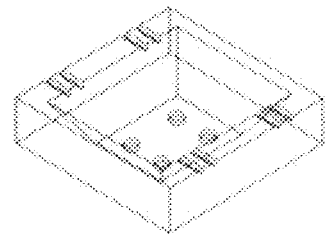
Figure 11D:

In a third step of the manufacturing process, designated by Block 122, a dry etching process is employed on front side 132 so as to form a plurality of openings 136 in the base of the cavity. Each of openings 136 is preferably adapted for receiving a core of one of the coils which form the stator assembly. FIGS. 11b-c show a side view (FIG. 11b) and an isometric view (FIG. 11c) of the formed cavity. An image of the cavity is shown in FIG. 12a.

In a fourth step of the manufacturing process, designated by Block 123 in FIG. 10, a plurality of coils (e.g., micro-coils) is attached into the cavity in a predetermined arrangement, so as to provide a stator assembly. Preferred dimensions of the coils are about 900 micrometers in height and about 750 micrometers in external diameter. Gaps between the coils may be filled by a filling material, such as, but not limited to, epoxy. The core of the coils, about 250 micrometer in thickness, is preferably made of a magnetic material CoNiFe, also known by the designation ASTM F-15 alloy and by the trade name Kovar™. CoNiFe alloys are capable of providing an extremely high saturation flux density combined with reasonably low coercive field strength. Typically, each the coil has about 114 turns of a metal (e.g., copper) wire, about 30 microns in thickness, around the core.

The micro-coils and the formed stator assembly are shown in FIGS. 12b-c, where FIG. 12b is an image exemplifying two coils each having a core 133, and FIG. 12c is an image of the stator assembly with the coils attached to the cavity.

In a fifth step of the manufacturing process, designated by Block 124 in FIG. 10, the cavity is preferably covered by Kovar™, or any other suitable material, to protect the coils therein. The cover of the cavity can also be used as a part of the magnetic circuit which generates the desired magnetic field. In this embodiment, the depth of the cavity and the height of the cores are preferably such that a contact is established between the cover and the cores.

In a sixth step of the manufacturing process, designated by Block 125, a magnetic pole is attached to each core which protrudes through the opening in the base of the cavity from front side 132. The poles are preferably of a trapezoidal shape and positioned pairwise such that the magnetic field is generated between pairs of poles.

Referring now again to the flowchart diagram of FIG. 6, once manufactured, the stator and the rotor assemblies are assembled together to form the MEMS. The rotor assembly is preferably positioned such that the magnetic material thereon is in line with the magnetic poles of the stator assembly, hence closing the magnetic circuit. FIG. 13 is an image showing a top view of the MEMS manufactured using the above method steps. Shown in FIG. 13 are micromirror 142 of the rotor assembly and poles 144 of the stator assembly.

According to a preferred embodiment of the present invention the method further comprises an optional step in which a selective light transmissive substrate is manufactured. Reference is now made to FIG. 14 which is a schematic illustration of light transmissive substrate 40. The manufacturing of substrate 40 preferably comprises the following method steps in which in a first step an anti-reflective coat 152 and a dichroic coat 154 are evaporated on a first side 156 of substrate 40, and in a second step an anti-reflective coat 158, a reflective coat 160 and a dichroic coat 162 are evaporated on a second side 165 of substrate 40. Reflective coat 160 is preferably made of a material having high reflective properties to the wavelength (s) of the scanned light, such as, but not limited to, aluminum; and anti-reflective coats 152 and 158 can be for example, SiO.

The evaporation of the above coats is performed in a manner such that substrate 40 is capable of selectively transmitting the scanned light beam as further detailed hereinabove. For example, considering substrate 40 as comprising a first region 164 a second region 166 adjacent to first region 164 and a third region 168 adjacent to second region 166, anti-reflective coat 152 can be evaporated to coat first 166 and second 168 regions from first side 156, dichroic coat 154 can be evaporated to coat second 166 and third 168 regions from first side 156, anti-reflective coat 158 can be evaporated to coat third region 168 from second side 165, dichroic coat 162 can be evaporated to coat first region 164 from second side 165, and reflective coat 160 can be evaporated to coat second region 166 from second side 165.

As stated, the device of the present embodiment preferably comprises a non-visible light source for emitting non-visible optical signals to impinge on the micromirror, and a position sensitive detector for detecting the non-visible optical signals thereby to sense the orientation the micromirror. Thus, according to a preferred embodiment of the present invention in the MEMS manufacturing process comprises additional steps in which the non-visible light source and the position sensitive detector are positioned. These steps are designated by Blocks 87 and 88 in the flowchart diagram of FIG. 6. The micromirror, the non-visible light source and the position sensitive detector can be positioned along a straight line to preferably engage a single plane, thereby to minimize a thickness of the MEMS. Other configurations are also contemplated. Block 89 (FIG. 6) represents an additional optional step of the manufacturing process in which in which substrate 40 is positioned, preferably on top of the non-visible light source, the micromirror and the position sensitive detector (see FIG. 3).

FIG. 15 is an image of a MEMS, manufactured by executing the above process steps. For illustrative purposes, the image in FIG. 15 does not include substrate 40.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

What is claimed is:

1. A device for scanning a light beam, comprising:
a first micromirror for scanning the light beam along a first axis, said first micromirror having a reflective surface connected to elongated wings and a magnetic material mounted on said wings;
a second micromirror for scanning the light beam along a second axis;
at least one magnetic circuit configured for generating a step-wave modulated magnetic field for subjecting said first micromirror to a first driving force to assume a plurality of substantially discrete angular positions; and
a mechanism configured for subjecting said second micromirror to a second driving force to perform a continuous and periodic rotary motion, wherein said second driving force is modulated by a modulating function other than said step-wave.

2. The device of claim 1, wherein said second driving force is applied by at least one mechanism selected from the group consisting of a magnetic circuit, a piezoelectric driving mechanism, an electrostatic driving mechanism and a bimetallic driving mechanism.

3. The device of claim 1, wherein a characteristic frequency of said modulating function other than said step wave substantially equals a resonance frequency of said second micromirror.

4. The device of claim 1, further comprising a sensing mechanism for sensing a scanning position of the light beam, and a synchronizer, for using said scanning position to synchronize said plurality of substantially discrete angular positions of said first micromirror and said continuous and periodic rotary motion of said second micromirror.

5. The device of claim 4, wherein said sensing mechanism comprises at least one position sensitive detector.

6. The device of claim 1, wherein a shape of said first and/or second micromirrors is selected so as to minimize a moment-of-inertia thereof.

7. The device of claim 6, wherein said second micromirror comprises a reflective surface and elongated wings connected thereto.

8. The device of claim 1, wherein said at least one magnetic circuit comprises a plurality of coils, arranged such at least two coils of said plurality of coils share a mutual core.

9. The device of claim 8, wherein said plurality of coils comprises four coils.

10. The device of claim 8, wherein said mutual core comprises a magnetic material describing a closed shape and having an airgap.

11. The device of claim 1, further comprising at least one optical element for establishing an optical path between said first micromirror and said second micromirror.

12. The device of claim 1, wherein said mechanism configured for subjecting said second micromirror to said second driving force comprises a second magnetic circuit.

13. The device of claim 12, wherein said second magnetic circuit comprises a plurality of coils, arranged such at least two coils of said plurality of coils share a mutual core.

14. The device of claim 13, wherein said plurality of coils comprises four coils.

15. A microelectromechanical system, comprising:
a rotor assembly, having at least one micromirror surrounded by a gaseous environment, said at least one micromirror having a reflective surface connected to elongated wings and a permanent magnetic material mounted on said wings; and
a stator assembly for applying a predetermined moment on said wings to establish rotary motion of said micromirror, said stator assembly having a magnetic circuit defined by a plurality of coils arranged such that at least two coils of said plurality of coils share a mutual core.

16. The microelectromechanical system of claim 15, wherein said at least one micromirror is capable of assuming a plurality of substantially discrete angular positions in response to a step-wave modulated magnetic field generated by said arrangement of coils.

17. The microelectromechanical system of claim 15, further comprising an additional rotor assembly having at least one micromirror rotatable about a second axis, and an additional stator assembly having an arrangement of coils for establishing a continuous rotary motion of said at least one micromirror about said second axis.

18. The microelectromechanical system of claim 15, further comprising a substrate having a plurality of cavities formed therein, whereby said stator assembly is positioned in at least one cavity of said plurality of cavities.

19. The microelectromechanical system of claim 15, wherein said mutual core comprises a magnetic material describing a closed shape and having an airgap, and wherein said micromirror is positioned in or above said airgap.

20. The method of claim 19, wherein said mutual core comprises a magnetic material describing a closed shape and having an airgap, and wherein said assembling said rotor assembly and said stator assembly is performed such that said micromirror is positioned in or above said airgap.

21. The microelectromechanical system of claim 15, wherein said plurality of coils comprises four coils.

22. A method of manufacturing a microelectromechanical system, the method comprising:
(a) patterning and etching a first substrate so as to provide a micromirror having elongated wings;
(b) attaching a permanent magnetic material on said elongated wings of said micromirror, thereby providing a rotor assembly;
(c) patterning and etching a second substrate so as to form at least one cavity therein;
(d) attaching a plurality of coils into said at least one cavity in a predetermined arrangement, thereby providing a stator assembly having an arrangement of coils; and
(e) assembling said rotor assembly and said stator assembly, so as to allow a rotary motion of said micromirror in response to a magnetic field generated by said arrangement of coils.

23. The method of claim 22, further comprising applying a reflective coat on said micromirror so as to improve a reflectivity thereof.

24. The method of claim 22, wherein said attaching a plurality of coils is performed such that at least two coils share a mutual core.

25. The method of claim 22, wherein said plurality of coils comprises four coils.

* * * * *